United States Patent
Bachmaier et al.

(10) Patent No.: US 9,841,061 B2
(45) Date of Patent: Dec. 12, 2017

(54) TORQUE TRANSMISSION DEVICE, ACTUATOR AND ROBOT

(71) Applicant: SIEMENS AKTIENGESELLSCHAFT, München (DE)

(72) Inventors: Georg Bachmaier, München (DE); Marco Cyriacks, München (DE); Andreas Gödecke, München (DE); Wolfgang Zöls, München-Lochhausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/777,250

(22) PCT Filed: Jan. 15, 2014

(86) PCT No.: PCT/EP2014/050710
§ 371 (c)(1),
(2) Date: Sep. 15, 2015

(87) PCT Pub. No.: WO2014/139702
PCT Pub. Date: Sep. 18, 2014

(65) Prior Publication Data
US 2016/0025150 A1   Jan. 28, 2016

(30) Foreign Application Priority Data
Mar. 15, 2013 (DE) .................. 10 2013 204 588

(51) Int. Cl.
*F16D 3/80* (2006.01)
*F16F 15/16* (2006.01)
(Continued)

(52) U.S. Cl.
CPC ............ *F16D 3/80* (2013.01); *B25J 9/126* (2013.01); *F16D 3/66* (2013.01); *F16F 15/023* (2013.01);
(Continued)

(58) Field of Classification Search
CPC ..... F16D 3/66; F16D 3/80; B25J 9/126; F16F 15/023; F16F 15/16; F16F 15/161; Y10S 901/19; Y10S 901/23
(Continued)

(56) References Cited

U.S. PATENT DOCUMENTS

| | | | | |
|---|---|---|---|---|
| 1,815,639 A | * | 7/1931 | Wilkin | F16D 3/80 464/28 |
| 2,833,131 A | * | 5/1958 | Miller | F16D 3/80 464/28 |

(Continued)

FOREIGN PATENT DOCUMENTS

| | | |
|---|---|---|
| CN | 102075053 A | 5/2011 |
| DE | 1911285 A1 | 9/1970 |

(Continued)

OTHER PUBLICATIONS

Chinese Office Action for Chinese Patent Application No. 201480015982.X dated Mar. 30, 2016, with English Translation.

(Continued)

*Primary Examiner* — Gregory J Binda
(74) *Attorney, Agent, or Firm* — Lempia Summerfield Katz LLC

(57) ABSTRACT

A torque transmission device includes an inner ring, an outer ring, and at least one pair of receiving bellows. The at least one pair of receiving bellows includes a positive receiving bellows and a negative receiving bellows. The torque transmission device also includes at least one gas pressure spring and an adjusting unit connected to the at least one gas
(Continued)

pressure spring. The receiving bellows are arranged between the outer ring and the inner ring such that when the inner ring is rotated in the positive rotational direction, the positive receiving bellows may be compressed, and when the inner ring is rotated in the negative rotational direction, the negative receiving bellows may be compressed. In addition, the receiving bellows are connected to the at least one gas pressure spring in a fluidically conductive manner.

17 Claims, 3 Drawing Sheets

(51) Int. Cl.
*F16F 15/023* (2006.01)
*B25J 9/12* (2006.01)
*F16D 3/66* (2006.01)

(52) U.S. Cl.
CPC ........... *F16F 15/161* (2013.01); *Y10S 901/19* (2013.01); *Y10S 901/23* (2013.01)

(58) Field of Classification Search
USPC .............. 464/28, 79–85, 68.3, 68.92; 901/28
See application file for complete search history.

(56) References Cited

U.S. PATENT DOCUMENTS

| 4,434,949 | A | * | 3/1984 | Karr | ....................... B65H 18/20 |
| | | | | | 464/28 X |
| 4,614,084 | A | | 9/1986 | Clot et al. | |
| 4,712,780 | A | | 12/1987 | Ficht et al. | |
| 5,377,950 | A | | 1/1995 | Salcudean et al. | |
| 6,783,154 | B2 | * | 8/2004 | Persson | ................. B60R 21/235 |
| 9,121,452 | B2 | * | 9/2015 | Leonard | .................... F16D 3/80 |
| | | | | | 464/28 |
| 9,434,335 | B2 | * | 9/2016 | Ohmura | ................. B60R 21/00 |

FOREIGN PATENT DOCUMENTS

| DE | 3241461 A1 | 5/1984 |
| DE | 296245A5 A5 | 11/1991 |
| DE | 102009027219 A1 | 12/2010 |
| SU | 838146 | * | 6/1981 | ....................... 464/28 |

OTHER PUBLICATIONS

German Office Action for related German Application No. 10 2013 204 588.3, dated Sep. 3, 2013, with English Translation.
PCT International Search Report and Written Opinion of the International Searching Authority dated May 19, 2014 for corresponding PCT/EP2014/050710.

\* cited by examiner

TORQUE TRANSMISSION DEVICE, ACTUATOR AND ROBOT

This application is the National Stage of International Application No. PCT/EP2014/050710, filed Jan. 15, 2014, which claims the benefit of German Patent Application No. 10 2013 204 588.3, filed Mar. 15, 2013. The entire contents of these documents are hereby incorporated herein by reference.

BACKGROUND

The present embodiments relates to a torque transmission device having variably adjustable stiffness, to an actuator having the torque transmission device, and to a robot.

Robots are being used more and more in direct contact with humans whether in patient care or in industry. Common to these applications is that an increased demand is made on the safety of robots. Thus, a human being injured by a robot if he is accidentally struck by a moving robot part is to be ruled out. In the event of faults (e.g., in the area of wearable robotics), a human joint being acted upon with too much force and as a result being injured also is to be ruled out. A known approach to this problem is the use of actuators with variable stiffness.

A high degree of mechanical stiffness is desired for achieving high levels of positioning accuracy. However, if a robot part is to be moved rapidly, or if the movement of a human joint is to be matched, a flexible mechanism and consequently a low degree of stiffness is desirable for achieving a high level of safety. Two approaches are known for realizing actuators with variable stiffness (e.g., variable stiffness actuator (VSA)).

Actuators with a high degree of stiffness are supplemented by a force or torque sensor. Using a suitable controller, this makes it possible to simulate a stiffness that is below the mechanical one. The force sensor, in this case, measures the force existing at the actuator or the existing torque. In dependence on the torque, the excursion is adjusted such that a mechanical spring is simulated.

The excursion is adjusted in proportion to the existing torque. The proportionality factor corresponds to the virtual stiffness. A disadvantage of the approach is the lack of intrinsic safety as in the event of a fault (e.g., failure of the force sensor or the) the intrinsic high degree of stiffness of the actuator comes into play.

The second approach is the structure of actuators, the stiffness of which is realized so as to be modifiable in a purely mechanical manner. In this case, a lever system with a variable force application is used. An actuator is connected for this purpose, for example, by an additional mechanical element that includes a spring as a central mechanism. In order to vary the stiffness of the spring, the lever arm of the force application is adjustable, for example, by an electric motor. A disadvantage of the approach is the relatively large amount of space required for the structure.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved actuator with variable stiffness is provided.

The torque transmission device according to one or more of the present embodiments is provided with an inner ring, an outer ring that is arranged so as to be rotatable relative to the inner ring from a neutral position in a positive direction of rotation or negative direction of rotation, and at least one pair of receiving bellows. The at least one pair of receiving bellows includes a positive receiving bellows and a negative receiving bellows. The torque transmission device also includes at least one gas pressure spring and an adjusting unit that is connected to the at least one gas pressure spring. The receiving bellows are arranged between the outer ring and the inner ring such that the positive receiving bellows is compressible when the inner ring is rotated in the positive direction of rotation and the negative receiving bellows is compressible when the inner ring is rotated in the negative direction of rotation. The receiving bellows are also connected to the at least one gas pressure spring so as to conduct fluid. In one embodiment, in this case, a hydraulic fluid is used as fluid.

The torque transmission device according to one or more of the present embodiments includes very compact dimensions and, with the almost incompressible hydraulic fluid, is capable of providing very high degrees of stiffness. The hydraulic force transmission also includes a high level of self-damping. The natural vibrations of the system are strongly over-damped and only appear in the event of high frequencies. Consequently, the frequency response of the system is linear up to high frequencies, which provides that the torque transmission device according to one or more of the present embodiments has good controllability.

In one development of the torque transmission device, the at least one gas pressure spring includes a hermetically sealed gas pressure chamber and a transmission bellows that projects into the gas pressure chamber, and an adjusting bellows that projects into the gas pressure chamber. The receiving bellows, in this case, are connected to the transmission bellows so as to conduct fluid, and the adjusting unit is connected to the adjusting bellows so as to conduct fluid.

An adjustable, compact, and more durable gas pressure spring is realized in this manner.

In a further development of the torque transmission device, the adjusting unit includes a reservoir and a pump. The pump is, for example, a piezo-pump. The piezo-pumps may also be provided with a non-return valve that is designed to be self-opening in the event of a fault (e.g., normally open).

With the reservoir and the pump, a hydraulic adjusting unit with simple and cost-efficient components is provided. In an advantageous manner, the piezo-pump uses a small installation space and operates in an effective manner. In the event of a fault (e.g., if the power supply or the control signal fails), the stiffness of the transmission torque device is automatically reduced to the minimum via the non-return valve, which provides the safe state of the system. The system is consequently intrinsically safe.

In a further development of the torque transmission device, the torque transmission device includes two gas pressure springs that are connected to the adjusting unit. In this case, the at least one positive receiving bellows is connected to one of the two gas pressure springs so as to conduct fluid, and the at least one negative receiving bellows is connected to the other of the two gas pressure springs so as to conduct fluid.

Consequently, the receiving bellows have one gas pressure spring available in each case both for the compression movement and for the expansion movement. In an advantageous manner, both compression phases and tension phases of the receiving bellows are able to be influenced.

In a further development of the torque transmission device, the adjusting unit includes a separate pump per gas pressure spring.

The gas pressure springs may consequently be adjusted independently of one another. In an advantageous manner, the stiffness of the torque transmission device is consequently designable and modifiable in a different manner in dependence on the direction. The compression phases are able to be designed differently to the tension phases.

In a further development of the torque transmission device, the torque transmission device includes two pairs of receiving bellows.

Consequently, the introduction of force may be distributed in a better manner. The individual receiving bellows are consequently exposed to smaller loads. In addition, the guiding of the inner ring is improved without additional supporting elements.

In a further advantageous development of the torque transmission device, at least one of the bellows is a metal bellows.

Metal bellows are extremely sturdy, even at high temperatures and under the influence of aggressive environmental conditions. This lends durability and safety to the torque transmission device.

In a further advantageous development of the torque transmission device, the torque transmission device includes substantially the form of a cylinder with a circular surface area.

Consequently, the torque transmission device is provided with a shape that may easily be added to the shape of a usual servomotor. The servomotor and the torque transmission device together only take up a little more space than the servomotor on its own.

Thus, the torque transmission device according to one or more of the present embodiments is integrated in all developments into an actuator that includes a servomotor along with the torque transmission device. The servomotor includes a rotor and a stator. According to one or more of the present embodiments, the stator of the servomotor is non-rotatably connected to the outer ring or the inner ring of the torque transmission device.

Consequently, an actuator with variable stiffness is provided in an advantageous manner. The advantages of the torque transmission device according to one or more of the present embodiments are seen with the actuator as a module. In one embodiment, the actuator is integrated in a robot. The actuator, in this case, is connected to the mechanical unit so as to transmit force or so as to transmit torque.

The mechanical unit of the robot may be operated with different levels of stiffness on account of the actuator according to one or more of the present embodiments. Consequently, the robot provides a high level of safety precisely in direct contact with humans.

DETAILED DESCRIPTION

Figure 1:
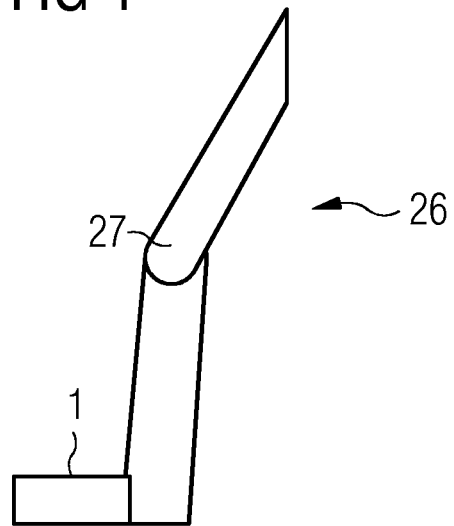
FIG. 1 shows one embodiment of a robot.

A sketch of the robot 26 according to one or more of the present embodiments is shown in FIG. 1. The robot 26 includes an actuator 1 that is connected to a mechanical unit 27 so as to transmit force or so as to transmit torque. The position of the mechanical unit 27 is modifiable as a result of the operation of the actuator 1. The mechanical unit 27 is realized so as to convert the movement generated by the actuator 1. The mechanical unit 27 is able to perform, for example, a rotation, a translatory movement or a combination of both movements.

Figure 2:
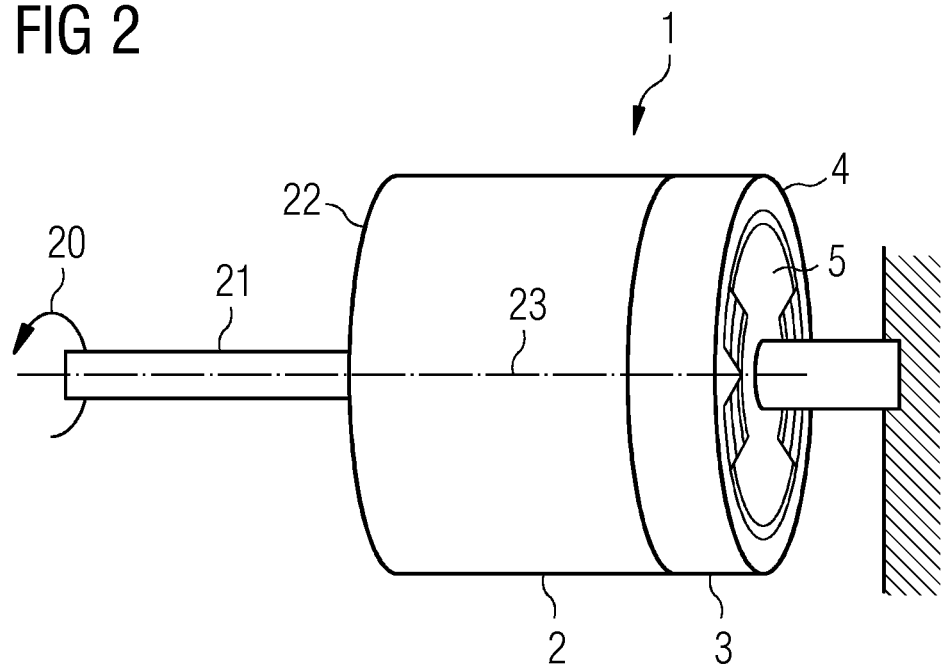
FIG. 2 shows one embodiment of an actuator.

The actuator 1 according to one or more of the present embodiments is shown as an example in FIG. 2. The actuator 1 includes a servomotor 2 and a torque transmission device 3. The servomotor 2 includes a rotor 21 and a stator 22. The rotor 21 is mounted on a rotational axis 23 so as to rotate in relation to the stator 22. The stator 22 may be arranged around the rotor 21. The stator 22 is shown in this manner in FIG. 1. The rotor 21 may also be arranged around the stator 22. In terms of the present embodiments, the stator 22 is the supporting element, and the rotor 21 is the movable element. According to one or more of the present embodiments, the stator 22 is non-rotatably connected to the torque transmission device 3.

According to one or more of the present embodiments, the torque transmission device 3 includes an inner ring 5 and an outer ring 4 that is arranged around the inner ring 5. The outer ring 4 and the inner ring 5 are arranged concentrically with respect to the rotational axis 23. The outer ring 4 is rotatable about a certain torsional angle on the rotational axis 23 in relation to the inner ring 5. In the example shown in FIG. 1, the inner ring 5 of the torque transmission device 3 is fixedly clamped, and the stator 22 of the servomotor 2 is fastened to the outside ring 4 of the torque transmission device 3 so as to transmit torque. Torque reduction 20 may consequently take place at the rotor 21. In one embodiment, the outer ring 4 of the torque transmission device 3 may be fixedly clamped, and the stator 22 of the servomotor 2 may be non-rotatably connected to the inner ring 5 of the torque transmission device 3.

Figure 3:
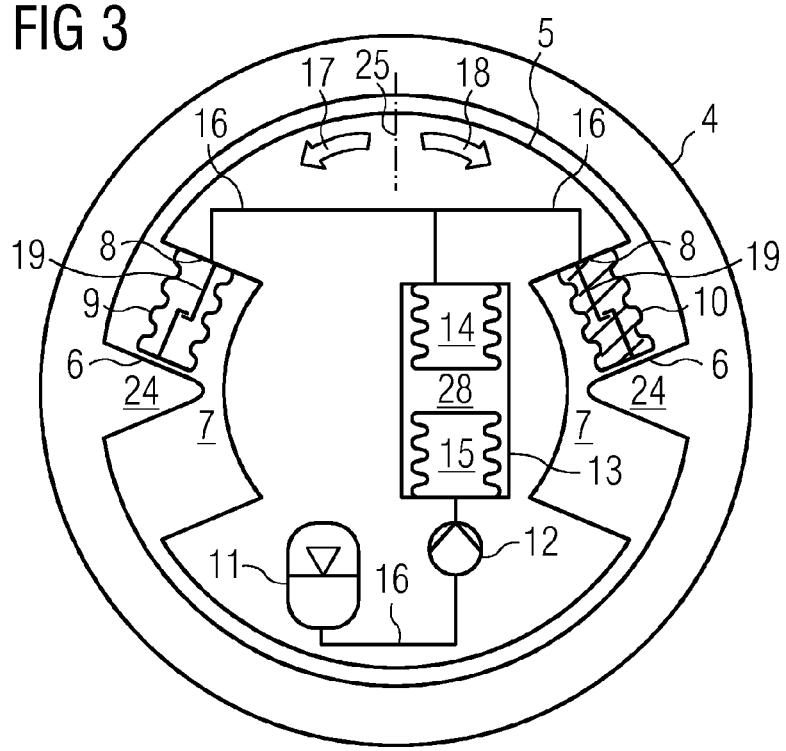
FIGS. 3 to 5 show different developments of a torque transmission device of the actuator.
Figure 4:
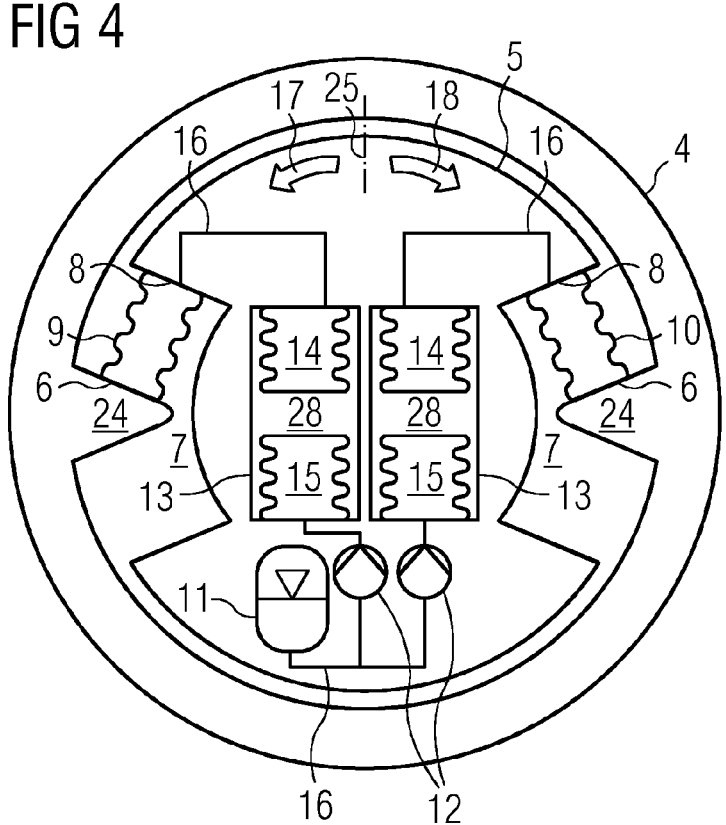

Different variants of the torque transmission device 3 are shown as an example in FIGS. 2 to 4. In addition to the outer ring 4 and to the inner ring 5, the torque transmission device 3 according to one or more of the present embodiments includes at least one pair of receiving bellows 9, 10, a gas pressure spring 13, an adjusting unit, and fluid lines 16.

In FIGS. 2 to 4, the inner ring 5 of the torque transmission device 3 according to one or more of the present embodiments is shown in each case in a neutral position. The inner ring 5 is able to rotate in a positive direction of rotation 17 or in a negative direction of rotation 18 in relation to the outer ring 4.

The outer ring 4 includes at least two moldings 24. Each molding 24 projects into a recess 7 of the inner ring 5. At least one driver 6 is situated in each case at the moldings 24. At each recess 7, the inner ring 5 includes a support 8 at a region that is positioned opposite the driver 6. In each case, one of the receiving bellows 9, 10 is arranged between the support 8 of the inner ring 5 and the driver 6 of the outer ring 4. The receiving bellows 9, 10 are fastened in each case at least to the support 8. In terms of one or more of the present embodiments, a bellows may also be a hydraulic cylinder or the like (e.g., the bellows is produced from metal).

The at least one pair of receiving bellows 9, 10 includes a positive receiving bellows 9 and a negative receiving bellows 10. In terms of one or more of the present embodiments, the positive receiving bellows 9 is arranged such that the positive receiving bellows 9 is compressed when the inner ring 5 is modified 5 in the positive direction of rotation 17 from the neutral position 2. The negative receiving bellows 10 is arranged such that the negative receiving bellows 10 is compressed when the inner ring 5 is modified in the negative direction of rotation 18 from the neutral position.

The receiving bellows 9, 10 are provided, according to one or more of the present embodiments, with a fluid (e.g., with a hydraulic fluid), such as, for example, silicone oil or glycerin. The receiving bellows 9, 10 are connected to the at least one gas pressure spring 13 so as to conduct fluid by the fluid lines 16.

According to one or more of the present embodiments, the at least one gas pressure spring 13 includes a hermetically sealed gas pressure chamber 28 that is filled with a fluid. The fluid is, for example, a gas and may be at an overpressure of between 2 bar and 10 bar. Two bellows 14, 15 that are positioned, for example, opposite one another, are arranged projecting into the gas pressure chamber 28 (e.g., a transmission bellows 14 and an adjusting bellows 15). The transmission bellows 14 is connected to the adjusting unit so as to conduct fluid by fluid lines 16. The adjusting bellows 15 is connected to the adjusting unit so as to conduct fluid by fluid lines 16.

According to one or more of the present embodiments, the adjusting unit includes at least one pump 12 (e.g., a piezo-pump 12) and a reservoir 11 in which a fluid (e.g., a hydraulic fluid) may be held.

When the inner ring 5 is rotated in the positive direction of rotation 17 in relation to the outer ring 4, the pressure in the positive receiving bellows 9 is increased and a hydraulic fluid that is situated in the positive receiving bellows 9 is conducted through the fluid line 16 into the transmission bellows 14 of the at least one gas pressure spring 13. The transmission bellows 14 attempts to expand. According to one or more of the present embodiments, the torque to be provided for rotation in the positive direction of rotation 17 is adjustable in a variable manner by the pressure in the gas pressure chamber 28.

When the inner ring 5 is rotated in the negative direction of rotation 18 in relation to the outer ring 4, the pressure in the negative receiving bellows 10 is increased and a hydraulic fluid located in the negative receiving bellows 10 is conducted through the fluid line 16 into the transmission bellows 14 of the at least one gas pressure spring 13. The transmission bellows 14 attempts to expand. According to one or more of the present embodiments, the torque to be provided for rotation in the negative direction of rotation 18 is adjustable in a variable manner by the pressure in the gas pressure chamber 28.

The pressure in the gas pressure chamber 28 of the gas pressure spring 13 acts on the transmission bellows 14 and the adjusting bellows 15. The adjusting bellow 15 is realized such that the gas volume in the gas pressure spring 13 is compressible. Using the pump 12 of the adjusting unit, a fluid (e.g., a hydraulic fluid) is pumpable out of the reservoir 11 into the adjusting bellows 15, or out of the adjusting bellows 15. In this way, the stiffness of the gas pressure spring 13 is able to be adjusted within a broad range.

If the adjusting bellows 15 is completely emptied, the gas in the gas pressure chamber 28 may take-in a high volume at a low pressure. The transmission bellows 14 may consequently expand without the pressure in the gas pressure chamber 28 increasing significantly (e.g., the gas pressure spring 13 has a small amount of stiffness in this position).

Figure 5:
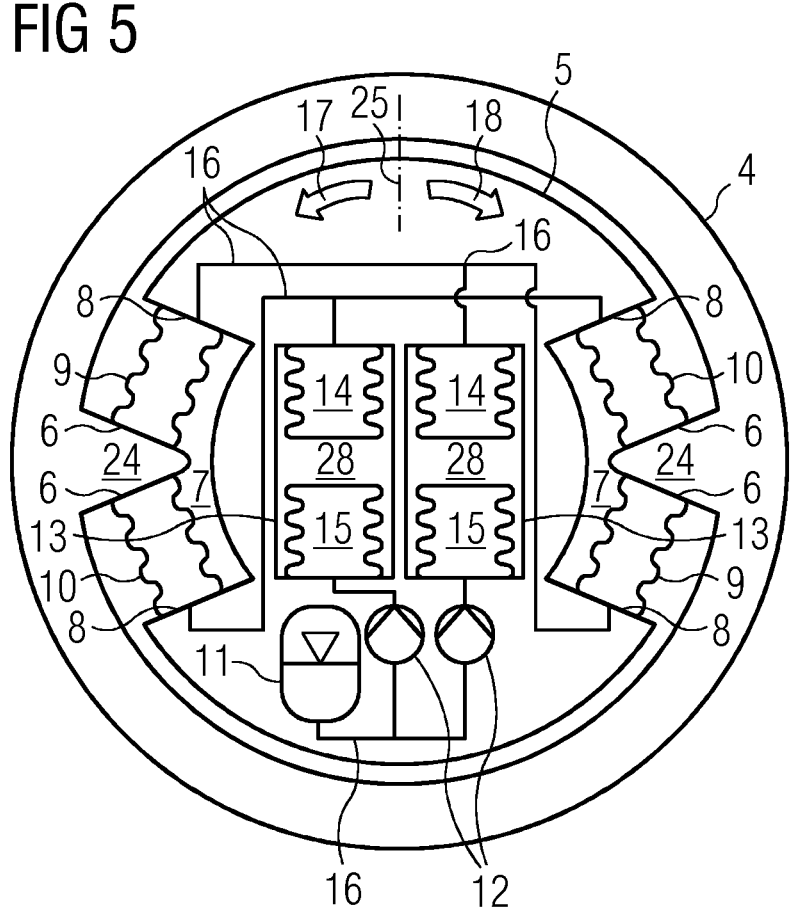

If the adjusting bellows 15, in contrast, is filled up to an end position, as is thus shown in FIGS. 3 to 5, a slight expansion of the transmission bellows 14 already results in a high increase in pressure in the gas pressure chamber 28 and consequently in a high counter force onto the transmission bellows. The gas pressure spring 13 has a high level of stiffness in this position.

As the transmission bellows 14 transmits the pressure of the gas pressure chamber 28 of the gas pressure spring 13 to the receiving bellows 9, 10, and a torque is built up there, the variable stiffness of the gas pressure spring 13 therefore translates directly into a variable torsion spring characteristic. According to one or more of the present embodiments, the volume of the adjusting bellows 15 is variable by the pump 12, and as a result, the rotational stiffness of the torque transmission device 3 according to one or more of the present embodiments is adjustable. This is effected within a few seconds or fractions of a second, depending on the design of the output of the pump 12.

The adjusting unit is controlled or regulated by a control unit that is not shown here in any detail and to which the adjusting unit is connected. In addition, sensors that detect states such as, for example, the pressure in at least one of the bellows, may be arranged in the torque transmission device 3.

The torque transmission device 3 may also include support elements. For example, rolling elements may be arranged between the outer ring 4 and the inner ring 5.

The realization variant of the torque transmission device 3 according to one or more of the present embodiments shown as an example in FIG. 3 includes one single pair of receiving bellows 9, 10 and one single gas pressure spring 13. The adjusting unit includes one single pump 12.

The receiving bellows 9, 10 are fastened in each case to the support 9 and rest loosely on the driver 6. The receiving bellows 9, 10 include in each case a stop 19 that prevents the receiving bellows 9, 10 from expanding beyond the dimension available when the inner ring 5 is in the neutral position 25. Both receiving bellows 9, 10 include a maximum volume in the neutral position 25. When the inner ring 5 is rotated in relation to the outer ring 5 out of the neutral position, one of the receiving bellows 9, 10 is compressed, and the other of the receiving bellows 10, 9 maintains its volume. During the compression, the above-described damping is performed by the gas pressure spring 13. The torque transmission device 3 has no stiffness when the torque transmission device 3 is rotated in the opposite direction into the neutral position 25. Torque is able to work freely until the neutral position has been reached again.

Compared to the variant shown in FIG. 3, the variant of the torque transmission device 3 according to one or more of the present embodiments shown as an example in FIG. 4 includes two gas pressure springs 13. Each of the gas pressure springs is connected to one receiving bellows 9, 10 of the pair of receiving bellows (e.g., just one single pair) by fluid lines 16 so as to conduct fluid.

With two gas pressure springs 13, the number of gas pressure springs 13 corresponds to the possible directions of rotation 17, 18. The two gas pressure springs 13 are separately controllable. The adjusting unit includes two pumps 12 for this purpose. Consequently, the receiving bellows 9, 10 are able to be influenced in each case not only in a pressure phase but also in a tension phase. Whereas one of the gas pressure springs 13 accompanies the pressure phase of the one receiving bellows 9, 10, at the same time the other of the gas pressure springs 13 influences the tension phase of the other receiving bellows 10, 9.

The receiving bellows 9, 10 do not include a stop 19 in this case. The receiving bellows 9, 10 are fastened in each case both to the support 8 of the inner ring 5 and to the driver 6 of the outer ring 4. The positive receiving bellows 9 includes a greatest volume with the inner ring 5 in the position in which the negative receiving bellows 10 includes a smallest volume and vice versa. For example, both pumps 12 may be operated in parallel such that each of the gas pressure springs 13 in each case includes the same inner stiffness.

In addition to the variant shown in FIG. 4, the variant of the torque transmission device 3 according to one or more of the present embodiments shown as an example in FIG. 5 includes two pairs of receiving bellows 9, 10. In this case, the two positive receiving bellows 9 are connected in parallel, and the two negative receiving bellows 10 are connected in parallel.

Although the invention has been illustrated and described in detail by the exemplary embodiments, the invention is not restricted by the disclosed examples, and other variations may be derived herefrom by the person skilled in the art without departing from the scope of protection of the invention.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A torque transmission device comprising:
   an inner ring;
   an outer ring arranged so as to be rotatable relative to the inner ring from a neutral position in a positive direction of rotation or negative direction of rotation;
   at least one pair of receiving bellows comprising a positive receiving bellows and a negative receiving bellows;
   at least one gas pressure spring; and
   an adjusting unit connected to the at least one gas pressure spring,
   wherein the receiving bellows are arranged between the outer ring and the inner ring in such a manner that the positive receiving bellows is compressible when the inner ring is rotated in the positive direction of rotation and the negative receiving bellows is compressible when the inner ring is rotated in the negative direction of rotation,
   wherein the receiving bellows are connected to the at least one gas pressure spring so as to conduct fluid,
   wherein the at least one gas pressure spring comprises a hermetically sealed gas pressure chamber and a transmission bellows that projects into the gas pressure chamber and an adjusting bellows that projects into the gas pressure chamber, and
   wherein the receiving bellows are connected to the transmission bellows so as to conduct fluid and the adjusting unit is connected to the adjusting bellows so as to conduct fluid.

2. The torque transmission device as claimed in claim 1, wherein the adjusting unit includes a reservoir and a pump.

3. The torque transmission device as claimed in claim 2, wherein the pump is a piezo-pump.

4. The torque transmission device as claimed in claim 3, wherein the torque transmission device comprises two gas pressure springs connected to the adjusting unit,
   wherein the at least one positive receiving bellows is connected to one of the two gas pressure springs so as to conduct fluid and the at least one negative receiving bellows is connected to the other of the two gas pressure springs so as to conduct fluid.

5. The torque transmission device as claimed in claim 4, wherein the at least one pair of receiving bellows comprises two pairs of receiving bellows.

6. The torque transmission device as claimed in claim 5, wherein the torque transmission device comprises a form of a cylinder with a circular surface area.

7. The torque transmission device as claimed in claim 6, wherein at least one bellows of the at least one pair of bellows is a metal bellows.

8. The torque transmission device as claimed in claim 1, wherein the torque transmission device comprises two gas pressure springs connected to the adjusting unit,
   wherein the at least one positive receiving bellows is connected to one of the two gas pressure springs so as to conduct fluid and the at least one negative receiving bellows is connected to the other of the two gas pressure springs so as to conduct fluid.

9. The torque transmission device as claimed in claim 8, wherein the adjusting unit comprises a separate pump per gas pressure spring.

10. The torque transmission device as claimed in claim 8, wherein the at least one pair of receiving bellows comprises two pairs of receiving bellows.

11. The torque transmission device as claimed in claim 8, wherein the torque transmission device comprises a form of a cylinder with a circular surface area.

12. The torque transmission device as claimed in claim 8, wherein at least one bellows of the at least one pair of bellows is a metal bellows.

13. The torque transmission device as claimed in claim 1, wherein the at least one pair of receiving bellows comprises two pairs of receiving bellows.

14. The torque transmission device as claimed in claim 1, wherein the torque transmission device comprises a form of a cylinder with a circular surface area.

15. The torque transmission device as claimed in claim 1, wherein at least one bellows of the at least one pair of bellows is a metal bellows.

16. An actuator comprising:
   a torque transmission device comprising:
      an inner ring;
      an outer ring arranged so as to be rotatable relative to the inner ring from a neutral position in a positive direction of rotation or negative direction of rotation;
      at least one pair of receiving bellows comprising a positive receiving bellows and a negative receiving bellows;
      at least one gas pressure spring; and
      an adjusting unit connected to the at least one gas pressure spring, wherein the receiving bellows are arranged between the outer ring and the inner ring in such a manner that the positive receiving bellows is compressible when the inner ring is rotated in the positive direction of rotation and the negative receiving bellows is compressible when the inner ring is rotated in the negative direction of rotation, wherein the receiving bellows are connected to the at least one gas pressure spring so as to conduct fluid, wherein the at least one gas pressure spring comprises a hermetically sealed gas pressure chamber and a transmission bellows that projects into the gas pressure chamber and an adjusting bellows that projects into the gas pressure chamber, and wherein the receiving bellows are connected to the transmission bellows so as to conduct fluid and the adjusting unit is connected to the adjusting bellows so as to conduct fluid; and a servomotor comprising:
  a rotor; and
  a stator, wherein the stator is non-rotatably connected to the outer ring or the inner ring of the torque transmission device.

17. A robot comprising:
a mechanical unit; and
an actuator comprising:
  a torque transmission device comprising:
    an inner ring;
    an outer ring arranged so as to be rotatable relative to the inner ring from a neutral position in a positive direction of rotation or negative direction of rotation;
    at least one pair of receiving bellows comprising a positive receiving bellows and a negative receiving bellows;
    at least one gas pressure spring; and
    an adjusting unit connected to the at least one gas pressure spring, wherein the receiving bellows are arranged between the outer ring and the inner ring in such a manner that the positive receiving bellows is compressible when the inner ring is rotated in the positive direction of rotation and the negative receiving bellows is compressible when the inner ring is rotated in the negative direction of rotation, wherein the receiving bellows are connected to the at least one gas pressure spring so as to conduct fluid, wherein the at least one gas pressure spring comprises a hermetically sealed gas pressure chamber and a transmission bellows that projects into the gas pressure chamber and an adjusting bellows that projects into the gas pressure chamber, and wherein the receiving bellows are connected to the transmission bellows so as to conduct fluid and the adjusting unit is connected to the adjusting bellows so as to conduct fluid;
  a servomotor comprising:
    a rotor; and
    a stator, wherein the stator is non-rotatably connected to the outer ring or the inner ring of the torque transmission device,
wherein the actuator is connected to the mechanical unit so as to transmit force or so as to transmit torque.

* * * * *